US011266957B2

(12) United States Patent
Ikushima (10) Patent No.: US 11,266,957 B2
(45) Date of Patent: *Mar. 8, 2022

(54) DISCHARGE DEVICE FOR LIQUID MATERIAL CONTAINING SOLID PARTICLES, DISCHARGE METHOD AND COATING DEVICE

(71) Applicant: MUSASHI ENGINEERING, INC., Mitaka (JP)

(72) Inventor: Kazumasa Ikushima, Tokyo (JP)

(73) Assignee: MUSASHI ENGINEERING, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/729,886

(22) Filed: Dec. 30, 2019

(65) Prior Publication Data

US 2020/0222862 A1   Jul. 16, 2020

Related U.S. Application Data

(63) Continuation of application No. 16/078,904, filed as application No. PCT/JP2017/006090 on Feb. 20, 2017, now Pat. No. 10,556,207.

(30) Foreign Application Priority Data

Feb. 24, 2016   (JP) .............................. JP2016-033682

(51) Int. Cl.
*B01F 3/08*       (2006.01)
*B01J 4/02*       (2006.01)
(Continued)

(52) U.S. Cl.
CPC .............. *B01F 3/0853* (2013.01); *B01F 3/12* (2013.01); *B01F 5/0068* (2013.01);
(Continued)

(58) Field of Classification Search
USPC .......... 118/300, 692, 694, 712, 684; 222/82, 222/144.5, 145.7, 1
See application file for complete search history.

(56) References Cited

U.S. PATENT DOCUMENTS 5,435,462 A   7/1995 Fujii
7,387,681 B2   6/2008 Matsunaga et al.
(Continued)

FOREIGN PATENT DOCUMENTS

JP   H08-80464 A    3/1996
JP   2003-300000 A   10/2003
JP   4774407 B2     9/2011

*Primary Examiner* — Yewebdar T Tadesse
(74) *Attorney, Agent, or Firm* — Westerman, Hattori, Daniels & Adrian, LLP (57) ABSTRACT

Problem: To supply a device and a method for accurately discharging a fixed amount of a liquid, the liquid containing solid particles, in a state that the solid particles are dispersed in the liquid material. Solution: A discharge device for a liquid material containing solid particles includes a first reservoir, a first air pressure supply pipe, a metering portion having a metering hole, a plunger moving back and forth in the metering hole, a nozzle, a switching valve having a first position and a second position, a plunger driver, and a switching valve driver. The discharge device further includes a second reservoir, a second air pressure supply pipe, a branch portion provided in an upper portion of the metering hole and having a branch flow path, and an opening/closing mechanism that establishes or cuts off communication between the second reservoir and the metering hole. In the discharge device, the liquid material inside the first reservoir can be transferred to the second reservoir, and the liquid material inside the second reservoir can be transferred to the first reservoir. A discharge method is carried out using the discharge device.

18 Claims, 5 Drawing Sheets

(51) Int. Cl.
*B05C 5/02* (2006.01)
*B05C 11/10* (2006.01)
*B05D 1/26* (2006.01)
*B01F 11/00* (2006.01)
*B05C 5/00* (2006.01)
*B01F 15/02* (2006.01)
*B01F 3/12* (2006.01)
*B01F 5/00* (2006.01)
*B01F 15/04* (2006.01)

(52) U.S. Cl.
CPC ...... *B01F 11/0071* (2013.01); *B01F 15/0202* (2013.01); *B01F 15/0278* (2013.01); *B01F 15/0279* (2013.01); *B01F 15/0429* (2013.01); *B01J 4/02* (2013.01); *B05C 5/00* (2013.01); *B05C 11/10* (2013.01); *B05D 1/26* (2013.01); *B05C 5/0225* (2013.01); *B05C 11/1007* (2013.01); *B05C 11/1026* (2013.01)

(56) References Cited

U.S. PATENT DOCUMENTS

| | | |
|---|---|---|
| 8,763,860 B2 | 7/2014 | Ikushima |
| 9,957,150 B2 | 5/2018 | Ikushima |
| 10,556,207 B2 * | 2/2020 | Ikushima ............ B01F 15/0278 |
| 2005/0150449 A1 | 7/2005 | Matsunaga et al. |
| 2009/0236366 A1 | 9/2009 | Ikushima |
| 2014/0252026 A1 | 9/2014 | Ikushima |
| 2018/0208450 A1 | 7/2018 | Ikushima |

* cited by examiner

DISCHARGE DEVICE FOR LIQUID MATERIAL CONTAINING SOLID PARTICLES, DISCHARGE METHOD AND COATING DEVICE

This application is a continuation of U.S. application Ser. No. 16/078,904, filed on Aug. 22, 2018, which is a National Stage of International Application No. PCT/JP2017/006090, filed on Feb. 20, 2017, which claims priority to Japanese priority application No. 2016-033682 filed on Feb. 24, 2016, which are hereby incorporated by reference.

TECHNICAL FIELD

The present invention relates to a device and a method for stirring a liquid material containing solid particles, and applying the liquid material in a state that the solid particles are dispersed in the liquid material.

BACKGROUND ART

As a device for distributing various kinds of liquid materials in units of a predetermined amount, there is known a device, called a "dispenser", including a container storing a liquid material, and discharging the liquid material in units of a predetermined amount from a nozzle, which is connected to the container, by the action of gas pressure or mechanical pressure. As one example of dispensers proposed by the applicant, Patent Document 1 discloses a dispenser in which the liquid material to be discharged is filled into a metering hole by moving a plunger backward, the plunger being held in slide contact with an inner wall of the metering hole, and the liquid material is discharged from the nozzle by moving the plunger forward.

In trying to utilize the dispenser to discharge, particular one among various kinds of liquid materials, especially a liquid mixed with solid particles having greater specific weight than the liquid, a problem arises, for example, in that the solid particles gradually precipitate onto a bottom portion of the container or into a recess in the flow path with the lapse of time. Moreover, if dispersion of the solid particles is insufficient, the nozzle is clogged, thus causing such a trouble that the liquid material can no longer be discharged. To prevent the above trouble, the solid particles need to be stirred and held in a state dispersed in the liquid.

Recently, the dispenser of the type having the structure disclosed in Patent Document 1 has been utilized in many cases to discharge the liquid mixed with the solid particles (e.g., a light transmissive resin mixed with LED phosphors). However, because the dispenser disclosed in Patent Document 1 does not include any means for stirring the liquid, the means for stirring the liquid is required.

A liquid is generally stirred by a stirrer provided on the container. Even with the provision of the stirrer on the container, however, the liquid material cannot be often discharged in the state of the solid particles being dispersed in the liquid material because precipitation of the solid particles occurs midway a pipe connecting the container and a discharge mechanism to each other. Aiming to solve the above problem, a method and a device, described below, have been proposed until now.

Patent Document 2 discloses a liquid discharge method including an adjustment step of applying pressure of 0.001 MPa to 10 MPa to a liquid containing solid particles, the liquid filled in at least one of two or more containers, reducing pressure of a liquid in at least one remaining container to be lower than the pressure of the liquid in the aforementioned at least one container, and adjusting a flow rate of the liquid in a flow path between the two or more containers by flow-rate adjustment means while allowing the liquid to flow through the flow path, and a discharge step of discharging the liquid from the flow path through a valve.

Patent Document 3 discloses a discharge device for a filler-mixed liquid material in which a discharge path having a substantially uniform inner diameter and extending up to a discharge port is disposed at a lower end of a container storing the filler-mixed liquid material, a valve having a penetration path and including a rotary valve body is disposed at a position near the discharge port, and a reciprocating pump is connected to the discharge path on the upstream side of the valve.

CITATION LIST

Patent Documents

Patent Document 1: Japanese Patent No. 4774407
Patent Document 2: Japanese Patent Laid-Open Publication No. 2003-300000
Patent Document 3: Japanese Patent Laid-Open Publication No. H08-80464

SUMMARY OF INVENTION

Technical Problem

There is a demand for technical means capable of stirring a liquid material containing solid particles with a simple device mechanism, and accurately discharging a fixed amount of the liquid material in a state that the solid particles are dispersed in the liquid material.

In the discharge device of the type, as in Patent Documents 2 and 3, discharging the liquid material by applying backpressure to the container in which the liquid material is stored, it is difficult to accurately discharge a desired amount of the liquid material because discharge control conditions are changed in a complicated way with change of the remaining amount of the liquid material in the container.

An object of the present invention is to provide a device and a method for accurately discharging a fixed amount of a liquid, the liquid containing solid particles in a state that the solid particles are dispersed in the liquid material.

Solution to Problem

The present invention provides a discharge device for a liquid material containing solid particles, the discharge device comprising a first reservoir that stores the liquid material containing the solid particles; a first air pressure supply pipe through which pressurized air is supplied to the first reservoir; a metering portion having a metering hole into which the liquid material is filled; a plunger moving back and forth in the metering hole; a nozzle having a discharge port through which the liquid material is discharged; a switching valve having a first position at which the first reservoir and the metering hole are communicated with each other, and a second position at which the metering hole and the nozzle are communicated with each other; a first liquid feed pipe that communicates the metering portion and the switching valve with each other; a plunger driver that moves the plunger back and forth; and a switching valve driver that shifts the switching valve between the first position and the second position, the discharge device further comprising a second reservoir that stores the liquid material; a second air pressure supply pipe through which pressurized air is supplied to the second reservoir; a branch portion provided in an upper portion of the metering hole and having a branch flow path; a second liquid feed pipe that communicates the branch flow path and the second reservoir with each other; and an opening/closing mechanism that establishes or cuts off communication between the second reservoir and the metering hole, wherein the liquid material inside the first reservoir is transferred to the second reservoir by supplying the pressurized air through the first air pressure supply pipe in a state that the switching valve is held at the first position and the opening/closing mechanism is held at an open position, and the liquid material inside the second reservoir is transferred to the first reservoir by supplying the pressurized air through the second air pressure supply pipe in the state that the switching valve is held at the first position and the opening/closing mechanism is held at the open position.

In the above discharge device, a volume ratio of the first reservoir to the second reservoir may be 1:0.5 to 1 or 0.5 to 1:1.

The above discharge device may further comprise a discharge control device including a processor and a storage device in which a discharge control program is stored, the discharge control program comprising a first transfer step of transferring the liquid material inside the first reservoir to the second reservoir by supplying the pressurized air through the first air pressure supply pipe in the state that the switching valve is held at the first position and the opening/closing mechanism is held at the open position; a second transfer step of transferring the liquid material inside the second reservoir to the first reservoir by supplying the pressurized air through the second air pressure supply pipe in the state that the switching valve is held at the first position and the opening/closing mechanism is held at the open position; and a continuous transfer step of alternately executing the first transfer step and the second transfer step.

In the above discharge device including the discharge control program, a tip end of the plunger may be brought into a state positioned above the branch flow path in the first and second transfer steps.

In the above discharge device including the discharge control program, the discharge control program may further comprise a discharge preparation step of ending execution of the continuous transfer step after completion of the second transfer step, shifting the opening/closing mechanism to a closed position, and shifting the switching valve to the second position; and a discharge step of descending the plunger through a desired distance and discharging the liquid material inside the metering hole. In this case, the liquid material inside the metering hole may be discharged plural times in the discharge step by repeating an operation of descending and stopping the plunger plural times.

In the above discharge device, the pressurized air under constant pressure may be continuously supplied through the first air pressure supply pipe, and the pressurized air under constant pressure may be continuously supplied through the second air pressure supply pipe. In this case, the pressurized air may be supplied through the first air pressure supply pipe for a preset time, and the pressurized air may be supplied through the second air pressure supply pipe for a preset time. As an alternative, the above discharge device may further comprise a first liquid sensor disposed in the first reservoir or the first liquid feed pipe; and a second liquid sensor disposed in the second reservoir or the second liquid feed pipe, wherein the pressurized air may be supplied in the first transfer step during a period until the first liquid sensor detects the absence of the liquid, and the pressurized air may be supplied in the second transfer step during a period until the second liquid sensor detects the absence of the liquid in the second transfer step.

The above discharge device may further comprise a seal disposed at a lower side of the branch portion and having an opening that allows the plunger to be held in slide contact with the seal, wherein the open position of the opening/closing mechanism may be obtained by positioning the tip end of the plunger above the seal, and a closed position of the opening/closing mechanism may be obtained by positioning the tip end of the plunger under the seal.

In the above discharge device, the opening/closing mechanism may be constituted by an opening/closing valve.

The present invention further provides an application apparatus comprising the above-described discharge device for the liquid material containing the solid particles, a worktable on which an application target object is placed, and a relatively moving device that moves the discharge device for the liquid material and the application target object relative to each other.

The present invention still further provides a discharge method for a liquid material containing solid particles, the discharge method executing the following steps using the above-described discharge device for the liquid material containing the solid particles: a first transfer step of transferring the liquid material inside the first reservoir to the second reservoir by supplying the pressurized air through the first air pressure supply pipe in the state that the switching valve is held at the first position and the opening/closing mechanism is held at the open position; a second transfer step of transferring the liquid material inside the second reservoir to the first reservoir by supplying the pressurized air through the second air pressure supply pipe in the state that the switching valve is held at the first position and the opening/closing mechanism is held at the open position; a discharge preparation step of shifting the opening/closing mechanism to a closed position and shifting the switching valve to the second position; and a discharge step of descending the plunger through a desired distance and discharging the liquid material inside the metering hole.

In the above discharge method, the solid particles may include solid particles having greater specific gravity than the liquid material. In this case, the solid particles may be LED phosphors.

In the above discharge method, 60% or more of the liquid material inside the first reservoir may be transferred to the second reservoir in the first transfer step, and 60% or more of the liquid material inside the second reservoir may be transferred to the first reservoir in the second transfer step.

Advantageous Effects of Invention

According to the present invention, the fixed amount of the liquid material containing the solid particles can be discharged with high accuracy in the state that the solid particles are dispersed in the liquid material.

Furthermore, since the flow of the liquid material in one flow path is reversed for stirring the liquid material, precipitation of the solid particles in the flow path is minimized.

Moreover, since the metering hole is disposed midway the flow path communicating the two reservoirs with each other, the stirring of the liquid material can be sufficiently performed within the metering hole.

DESCRIPTION OF EMBODIMENTS

Exemplary embodiments for carrying out the present invention will be described below. The wording "liquid material" used in this Description stands for a liquid material containing solid particles unless otherwise specified.

Example 1

(1) Constitution

Figure 1:
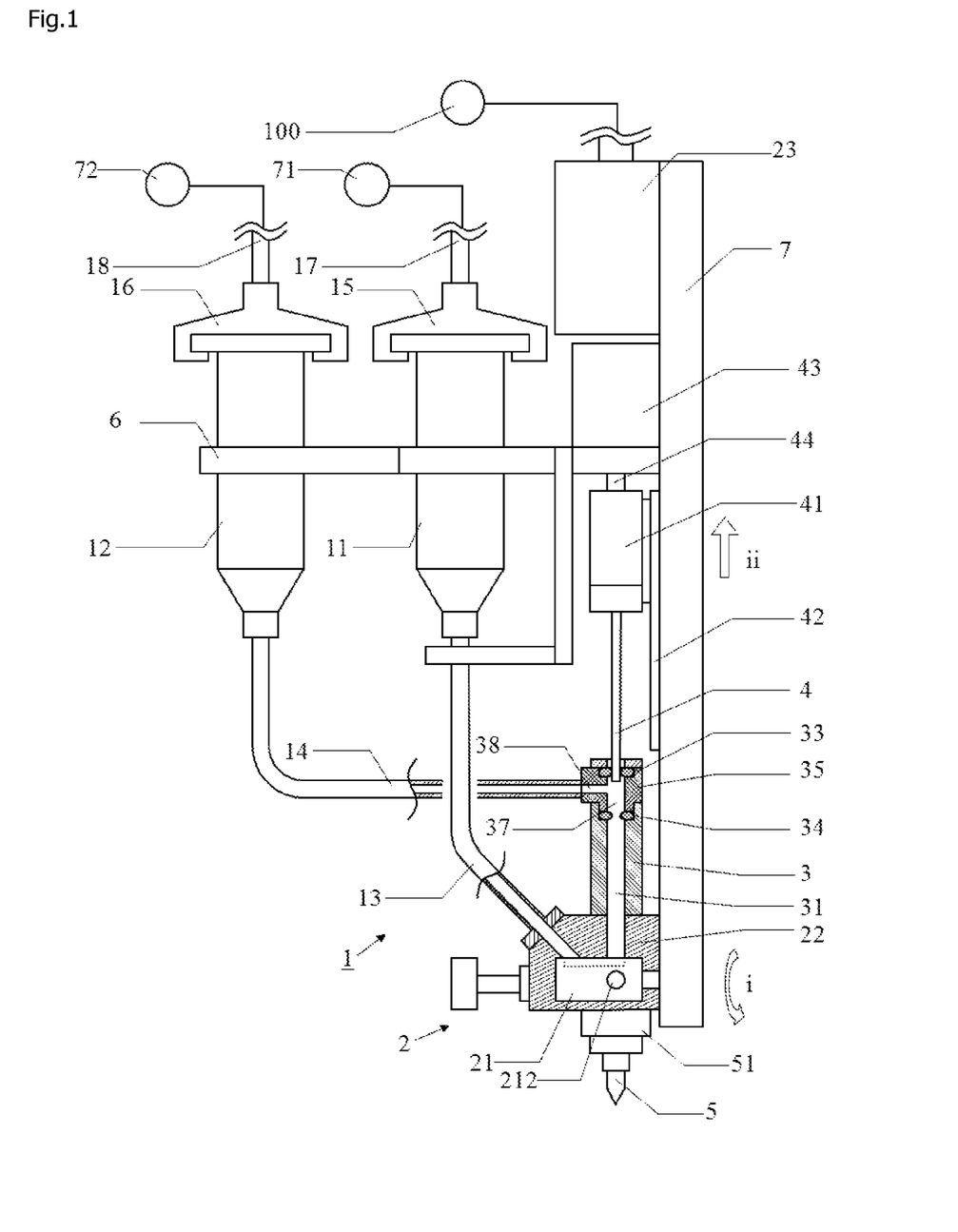
FIG. 1 is a side view of a discharge device according to Example 1 during a stirring operation.

FIG. 1 is a side view of a discharge device according to Example 1, the view being partly sectioned as denoted by hatching.

A discharge device 1 according to Example 1 includes reservoirs (11 and 12) storing a liquid material, a switching valve unit 2 that switches over communication between the reservoir (11, 12) and a metering portion 3 and communication between the metering portion 3 and a nozzle 5, the metering portion 3 in which the liquid material to be discharged is filled, a plunger 4 moving back and forth in the metering portion 3, the nozzle 5 having a discharge port through which the liquid material is discharged, a holder 6 holding the reservoirs (11 and 12), and a base member 7.

The reservoir A 11 and the reservoir B 12 are constituted by syringes having the same capacity, and are each held by the holder 6 that is coupled to the base member 7. Although the reservoir A 11 and the reservoir B 12 are not always required to have the same capacity, stirring efficiency increases when a large part of the liquid material stored in one of the two reservoirs can be transferred to the other reservoir. Therefore, a volume ratio of one reservoir to the other reservoir is preferably 1:05 to 1, more preferably 1:0.6 to 1, and even more preferably 1:0.7 to 1. A stirrer may be separately disposed in each of the reservoirs (11 and 12) in addition to the constitution of this Example.

A liquid feed pipe A 13 is detachably connected to an outlet port disposed at a lower end of the reservoir A 11, and a liquid feed pipe B 14 is detachably connected to an outlet port disposed at a lower end of the reservoir B 12. A connector A 15 is detachably fitted to a flange provided at an upper end of the reservoir A 11, and the reservoir A 11 receives pressurized air supplied from a pressurized air supply source A 71 via an air pressure supply pipe A 17. A connector B 16 is detachably fitted to a flange provided at an upper end of the reservoir B 12, and the reservoir B 12 receives pressurized air supplied from a pressurized air supply source B 72 via an air pressure supply pipe B 18. The meaning of the word "air" used in this Description is not limited to air, and includes other kinds of gases (e.g., nitrogen gas).

The liquid feed pipe A 13 is communicated with the switching valve unit 2 to be further communicated with a metering hole 31 via a communication groove 211 that is formed in a peripheral surface of a switching valve 21. The liquid feed pipe B 14 is communicated with a second area 38 of a branch portion 35. The liquid feed pipe A 13 and the liquid feed pipe B 14 can be each constituted by a pipe made of any suitable material. Thus, each liquid feed pipe may be constituted by a flexible pipe or may include a joint member.

The switching valve unit 2 includes the switching valve 21 and a valve block 22. The switching valve 21 is a rotary valve having a circular columnar shape, and it includes a communication groove 211 having a thin elongate shape and formed in a peripheral surface of the switching valve 21, and a through-hole 212 formed at a position not interfering with the communication groove 211. The switching valve 21 is driven to rotate by a switching valve driver 23 described later, and it takes a first position at which the liquid feed pipe A 13 and the metering hole 31 are communicated with each other via the communication groove 211, and a second position at which the nozzle 5 and the metering hole 31 are communicated with each other via the through-hole 212.

A nozzle coupling member 51 is disposed under the valve block 22, and the metering portion 3 is disposed above the valve block 22.

The nozzle coupling member 51 is screwed into and connected to the valve block 22, and it includes a straight discharge flow path having a center in alignment with a center of the metering hole 31. The nozzle 5 having the discharge port is detachably fitted to a lower end of the nozzle coupling member 51, and a center of the discharge port is positioned in alignment with the centers of both the metering hole 31 and the discharge flow path.

The metering portion 3 is constituted by a circular member having the metering hole 31 formed therein, and the branch portion 35 is disposed at the upper side of the metering portion 3. The metering hole 31 defines a straight flow path having a circular columnar shape, and is formed in a larger diameter than the plunger 4. A flow path having a T-like shape in section and including a first area 37 and a second area 38 is formed in the branch portion 35. The first area 37 has the same diameter as the metering hole 31, and the second area 38 serving as a branch flow path has a smaller diameter than the first area. A first seal 33 is disposed at an upper end of the first area 37 extending in a vertical direction, and a second seal 34 is disposed at a lower end of the first area 37. Each of the first seal 33 and the second seal 34 is an annular elastic member (e.g., an O-ring or a spring loaded seal), and has an opening of a size allowing the plunger 4 to be held in slide contact with the seal. The second seal 34 constitutes an opening/closing mechanism in cooperation with the plunger 4 as described later.

The plunger 4 is a rod-like member and is moved in the vertical direction using the plunger driver 43 and a slider 41. During a stirring operation described later, a tip end of the plunger 4 is positioned between an upper edge of the second area 38 and a lower end of the first seal 33 (see FIG. 1). During a discharge operation described later, the tip end of the plunger 4 is moved forward inside the metering hole 31 through a region under a lower end of the second seal 34 (see FIG. 2).

With the plunger 4 entering the metering hole 31, the volume of the metering hole 31 is reduced, and the liquid material is discharged from the discharge port that is opened downward. The plunger 4 may be moved down to a lowermost position with one forward-moving operation, or by repeating the forward-moving operation and a stop operation plural times until the plunger 4 is moved down to the lowermost position. In other words, the liquid material inside the metering hole 31 may be all discharged at a time, or may be discharged in discrete amounts several times.

The tip end of the plunger 4 may have any suitable shape without being limited to a flat plane as illustrated in the drawing. It is disclosed herein that the tip end of the plunger 4 may have, for example, a bomb-shell shape, a spherical shape, or a shape having a projected end.

The slider 41 is movably mounted to a vertically extending slide rail 42. An upper end of the slider 41 is coupled to a coupling member 44 of the plunger driver 43, and is vertically moved with operation of the plunger driver 43. The plunger driver 43 is fixed to the base member 7, and is constituted by an electrically-operated actuator or a linear actuator, for example.

The switching valve driver 23 is mounted to an uppermost portion of the base member 7. Driving force of the switching valve driver 23 is transmitted through a power transmission member (not illustrated) to rotate the switching valve 21. Here, an annular chain or belt, for example, is used as the power transmission member (see Patent Document 1). The discharge device 1 can be constituted in a relatively small width by arranging the switching valve driver 23 and the plunger driver 43 in the vertical direction.

A discharge control device 100 includes a processor and a storage unit storing a discharge control program. A discharge operation and a stirring operation, described later, in the present invention are automatically performed with execution of the discharge control program. The discharge control device 100 is connected to the above-mentioned drivers (23 and 43) and the pressurized air supply sources (71 and 72) via control wirings (part of which is not illustrated) such that control signals are communicated therebetween.

(2) Operations
(2-1) Stirring Operation

When the liquid material is stirred in the discharge device 1 constituted as described above, the following operation is performed in accordance with the discharge control program. It is here assumed that the liquid material is stored only in the reservoir A 11.

1) First, the switching valve driver 23 is operated to shift the switching valve 21 to the first position at which the liquid feed pipe A 13 (i.e., the reservoir A 11) and the metering hole 31 are communicated with each other (see an arrow i in FIG. 1).

2) The plunger driver 43 is operated to ascend the plunger 4 up to an uppermost position, thus causing the tip end of the plunger 4 to be positioned between the upper edge of the second area 38 and the lower end of the first seal 33 (see an arrow ii in FIG. 1).

3) The pressurized air is supplied under constant pressure to the reservoir A 11 from the pressurized air supply source A 71 via the air pressure supply pipe A 17 for a preset time. As a result, the liquid material is caused to flow through the liquid feed pipe A 13, the communication groove 211 of the switching valve 21, the metering hole 31, the first area 37, the second area 38, and the liquid feed pipe B 14 in sequence, whereby a certain amount of the liquid material is supplied to the reservoir B 12.

4) The operation of the pressurized air supply source A 71 is stopped, and the supply of the pressurized air via the air pressure supply pipe A 17 is stopped. Upon stop of the supply of the pressurized air, the pressure inside the reservoir A 11 lowers to a level before starting the supply of the pressurized air. Hence the flow of the liquid material having continued to flow toward the reservoir B 12 so far is stopped.

5) Next, the pressurized air is supplied under constant pressure to the reservoir B 12 from the pressurized air supply source B 72 via the air pressure supply pipe B 18 for a preset time. As a result, the liquid material is caused to flow through the liquid feed pipe B 14, the second area 38, the first area 37, the metering hole 31, the communication groove 211 of the switching valve 21, and the liquid feed pipe A 13 in sequence, whereby a certain amount of the liquid material is returned to the reservoir A 11. Here, the discharge control program may be designed to include a program with the function of monitoring the progress of the discharge operation, and reducing a supply time of the pressurized air depending on a consumed amount of the liquid material.

6) The operation of the pressurized air supply source B 72 is stopped, and the supply of the pressurized air via the air pressure supply pipe B 18 is stopped. Upon stop of the supply of the pressurized air, the pressure inside the reservoir B 12 lowers to a level before starting the supply of the pressurized air. Hence the flow of the liquid material having continued to flow toward the reservoir A 11 so far is stopped.

7) The above steps 3) to 6) are repeated. In the above steps 3) and 5), a large part (e.g., 50% or more, preferably 60% or more, and even more preferably 70% or more) of the liquid material stored in one reservoir is transferred to the other reservoir from the viewpoint of obtaining a sufficient stirring effect. Although the stirring may be performed by transferring almost all of the liquid material stored in one reservoir to the other reservoir, a problem of residual air occurs if air reaches the switching valve unit 2 or the metering hole 31. For that reason, the liquid material is preferably transferred within such a range that a position of the water head (i.e., a liquid level) is held in the liquid feed pipe (13, 14).

(2-2) Discharge Operation

Figure 2:
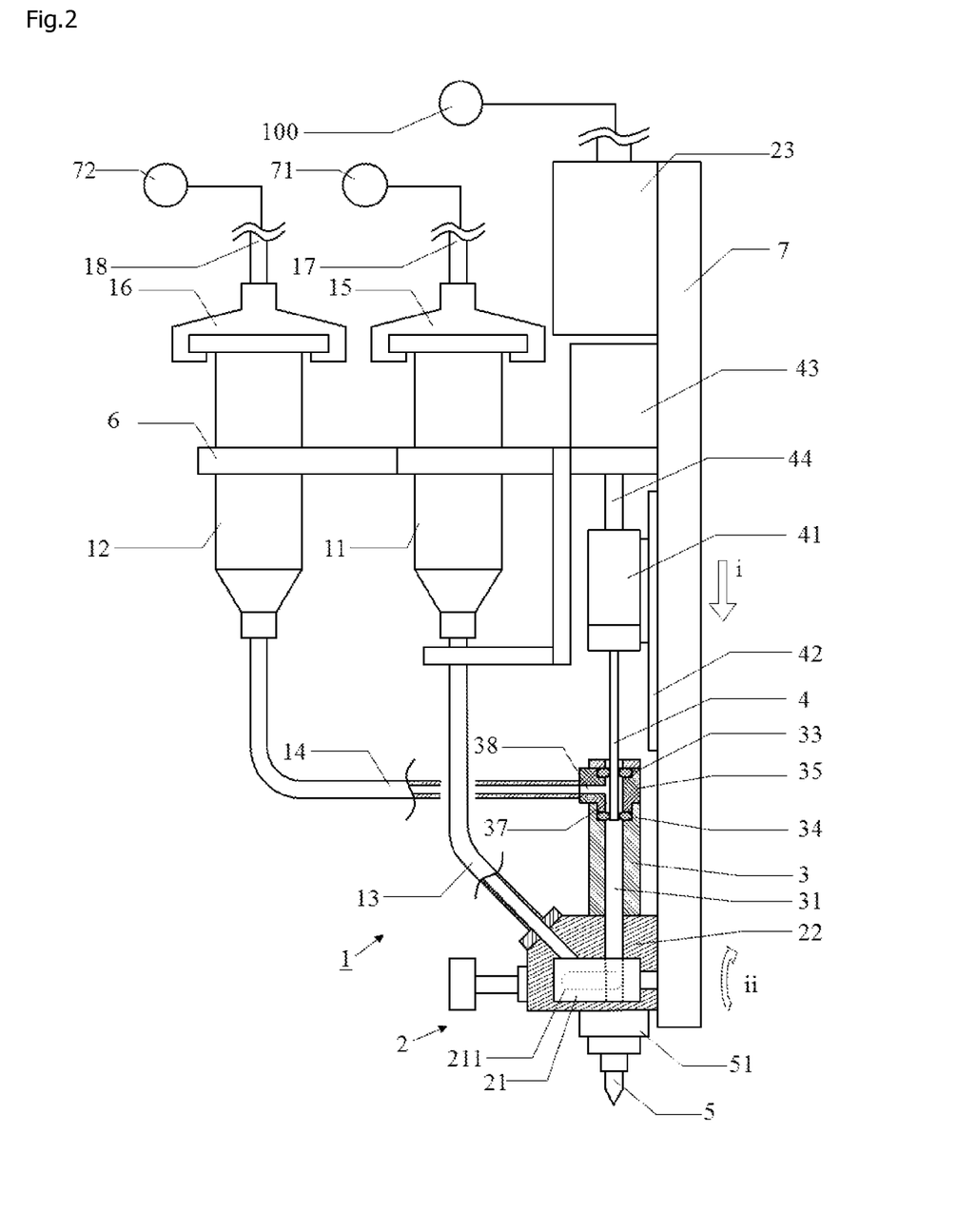
FIG. 2 is a side view of the discharge device according to Example 1 during a discharge operation.

When the liquid material is discharged from the nozzle 5 in the discharge device 1 constituted as described above, the following operation is performed in accordance with the discharge control program. The following description is made, by way of example, about the case in which the operation is shifted to the discharge operation from a state that the stirring operation is ended, that the switching valve 21 is held at the first position, and that the liquid material is filled in the metering hole 31, the first area 37, and the reservoir A 11 (although a small amount of the liquid material may remain in the reservoir B 12).

1) First, the plunger driver 43 is operated to descend the plunger 4, thus causing the tip end of the plunger 4 to be positioned slightly below the lower end of the second seal 34 (see an arrow i in FIG. 2). In other words, the plunger 4 is descended to a position at which the first seal 33 provides a sufficient sealing effect on the plunger 4. As a result, an outer peripheral surface of the plunger 4 comes into a state contacting an inner peripheral surface of the opening of the second seal 34, whereby the communication between the reservoir A 11 and the reservoir B 12 is cut off (namely, the second seal 34 and the plunger 4 serve as the opening/closing mechanism to cut off the communication between the reservoir A 11 and the reservoir B 12). At that time, because the switching valve 21 is held at the first position, the liquid material is prevented from uselessly leaking from the nozzle 5 even when the plunger 4 is descended.

2) The switching valve driver 23 is operated to shift the switching valve 21 to the second position at which the nozzle 5 and the metering hole 31 are communicated with each other via the through-hole 212 (see an arrow ii in FIG. 2).

3) The plunger driver 43 is operated to descend the plunger 4 through a desired distance, thus discharging the liquid material from the nozzle 5. At that time, the discharge may be performed by moving the plunger 4 down to the lowermost position with one forward-moving operation, or by moving the plunger 4 down to the lowermost position by repeating the forward-moving operation and the stop operation plural times.

4) In order to fill the liquid material into the metering hole 31, the switching valve driver 23 is first operated to shift the switching valve 21 to the first position at which the liquid feed pipe A 13 (i.e., the reservoir A 11) and the metering hole 31 are communicated with each other.

5) The plunger driver 43 is operated to ascend the plunger 4, thus causing the tip end of the plunger 4 to be positioned slightly below the lower end of the second seal 34. As a result, the liquid material inside the reservoir A 11 is filled into the metering hole 31. At that time, the filling operation may be expedited by supplying the pressurized air to the liquid material inside the reservoir A 11 via the air pressure supply pipe A 17.

6) Continuous discharge can be performed by repeating the above steps 2) to 5).

(3) Discharge Control Program

The discharge control program is designed as a program to perform the above-described stirring operation at preset timing (e.g., timing between the successive discharge operations). The program may be designed so as to perform the discharge operation after the stirring operation for the purpose of increasing the stirring action, or to repeatedly perform the stirring operation during a period in which the liquid material is not discharged. In more detail, the discharge control device 100 may include a timer for detecting that an operation command has not been received for a certain time (e.g., a time causing the problem of precipitation of particles, the time being previously set on the basis of measurement) or longer, and the program may be designed so as to perform the stirring operation once or plural times when the timer detects the lapse of the certain time (the timer being realized with hardware or software).

Irrespective of the timing of the discharge, etc., timing at which there is a time enough to perform the stirring operation until execution of the next discharge operation may be detected at a certain period, and the program may be designed so as to perform the stirring operation once or plural times at the detected timing.

(4) Application Apparatus

The discharge device 1 is mounted to an application head of an application apparatus and is used in work for applying the liquid material onto a workpiece while the application head (i.e., the discharge device 1) and a worktable are relatively moved by an XYZ-axis driver. The XYZ-axis driver is constituted, for example, as a known combination of XYZ-axis servomotors and ball screws, and it can move the discharge port of the discharge device 1 to any desired position on the workpiece at any desired speed.

(5) Intended Usages

The discharge device and method according to this Example is used in a step of applying a liquid material containing solid particles with greater specific gravity than the liquid material, such as a step of applying a liquid material, which is mixed with, for example, phosphors (corresponding to the solid particles), onto an LED element. The liquid material used in the step of applying the liquid material onto the LED element is, for example, an epoxy resin, a silicone resin, or an acrylic resin. The phosphors used in the application step include phosphors based on nitrides, oxynitrides, oxides, and sulfides. Practical examples of the phosphor are a YAG-based phosphor (chemical formula $Y_3Al_5O_{12}:Ce$) that is a yellow phosphor obtained by mixing another type of element, into a crystal made of a composite oxide of yttrium and aluminum and having a garnet structure, a LuAG-based phosphor that is a green phosphor and is expressed by chemical formula $Lu_3Al_5O_{12}:Ce$, an SCASN-based phosphor that is a red phosphor and is expressed by chemical formula $(Sr,Ca)AlSiN_3:Eu$, a CASN-based phosphor that is a red phosphor and is expressed by chemical formula $CaAlSiN_3:Eu$, an LSN-based phosphor that is a yellow phosphor and is expressed by chemical formula $La_3Si_6N_{11}:Ce$, a scandium oxide phosphor that is a green phosphor and is expressed by chemical formula $CaSc_2O_4:Ce$, and a sialon-based phosphor that is a green phosphor and is expressed by chemical formula SiAlON:Eu.

(6) Operational Effects

With the above-described discharge device 1 according to Example 1, since the liquid material containing the solid particles are stirred in the stirring operation, the discharge operation can be performed in the state that the solid particles are dispersed in the liquid material. In the related-art discharge device, because the upper end of the metering hole is a terminal end of the flow path, the liquid material cannot be sufficiently stirred within the metering hole. On the other hand, in Example 1, since the metering hole 31 is positioned midway the flow path communicating the reservoir A 11 and the reservoir B 12 with each other, the liquid material can be sufficiently stirred within the metering hole 31.

Furthermore, since the discharge device is of the discharge type discharging the liquid material in amount corresponding to the volume displaced by the forward-moving plunger 4, the desired amount of the liquid material can be discharged with higher accuracy than in the case of using a discharge method of controlling the discharge amount depending on the opening/closing time of an opening/closing valve.

Moreover, since a flow direction of the liquid material is reversed between the filling operation and the flowing operation, the solid particles having precipitated in the flow in a forward direction are often stirred upward with the flow in a backward direction. This leads to an operational effect that the solid particles in the flow path are less apt to precipitate.

Example 2

Figure 3:
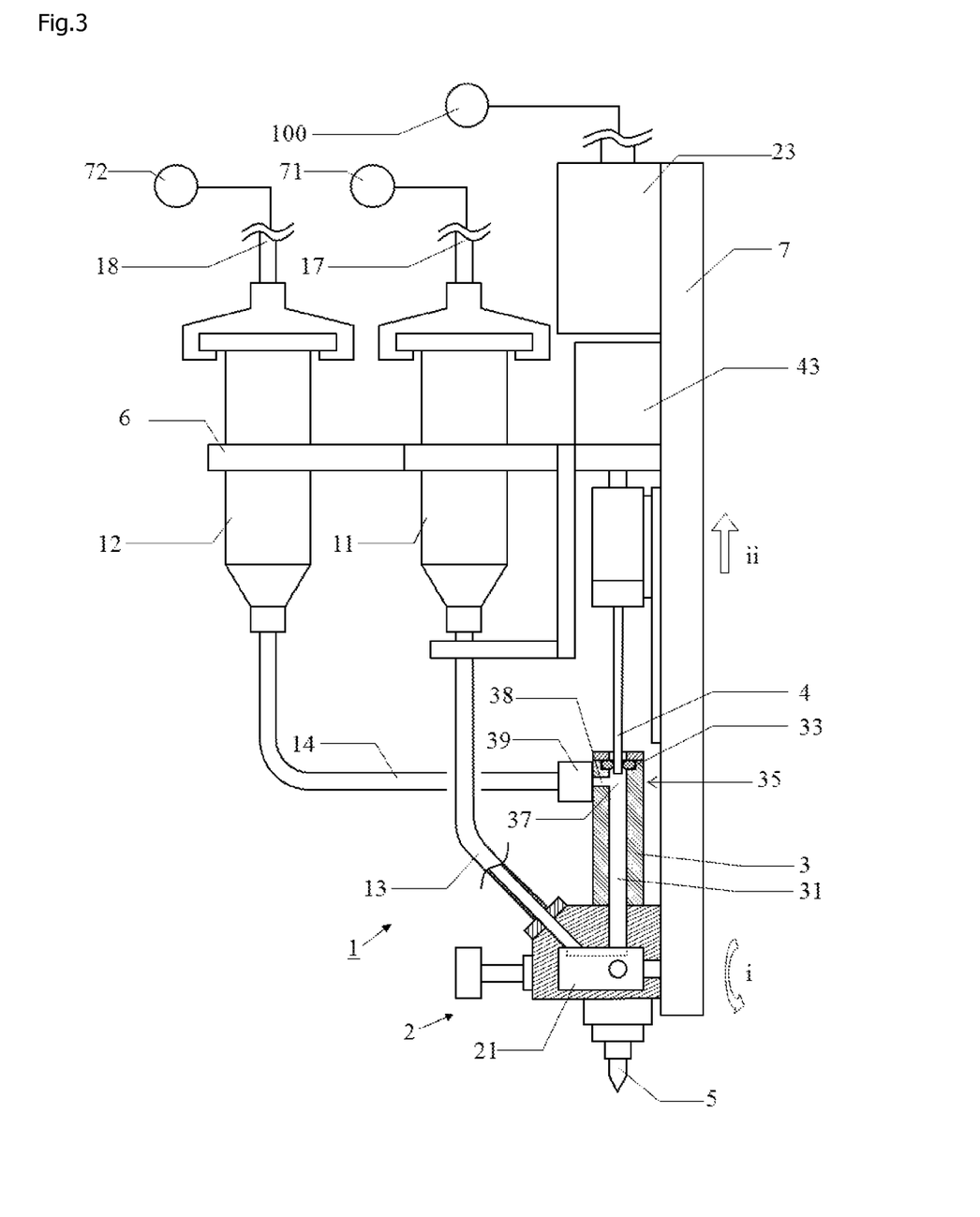
FIG. 3 is a side view of a discharge device according to Example 2.

A discharge device 1 according to Example 2 is mainly different from that according to Example 1 in including an opening/closing valve 39 that functions as the opening/closing mechanism. The following description is made mainly about different points, and description of the same points is omitted.

(1) Constitution

FIG. 3 is a side view of a discharge device according to Example 2, the view being partly sectioned as denoted by hatching.

The discharge device 1 according to Example 2 includes the first seal 33 disposed in the branch portion 35, but it does not include the second seal 34 disposed in Example 1. In this Example, the opening/closing valve 39 is disposed at an end of the liquid feed pipe B 14 on the side closer to the branch portion 35. The opening/closing valve 39 may be disposed at any desired position in the flow path communicating the reservoir B 12 and the first area 37 of the branch portion 35 with each other. However, because it is estimated that air enters the liquid feed pipe B 14 during the stirring operation and becomes residual air, the opening/closing valve 39 is preferably disposed at or near an opening end of the second area 38. In other words, for the reason that, during the stirring operation, the position of the water head (i.e., the liquid level) is to be avoided from reaching the opening/closing valve 39, the opening/closing valve is preferably disposed at the end of the liquid feed pipe B 14 on the side farther away from the reservoir B 12 or in the second area 38. The opening/closing valve 39 is connected to the discharge control device 100 via a control wiring (not illustrated), and is opened or closed by the discharge control device 100.

While the branch portion 35 and the metering portion 3 are formed integrally with each other in this Example, the branch portion 35 may be constituted as a separate component and joined to the metering portion 3.

The discharge control program is designed as a program to perform operations described below. Other points are similar to those in Example 1.

(2) Operations (2-1) Stirring Operation

When the liquid material is stirred in the discharge device 1 constituted as described above, the following operation is performed in accordance with the discharge control program. It is here assumed that the liquid material is stored only in the reservoir A 11.

1) First, the switching valve driver 23 is operated to shift the switching valve 21 to the first position at which the liquid feed pipe A 13 (i.e., the reservoir A 11) and the metering hole 31 are communicated with each other (see an arrow i in FIG. 3). The opening/closing valve 39 is set to an open position.

2) The plunger driver 43 is operated to ascend the plunger 4 up to the uppermost position, thus causing the tip end of the plunger 4 to be positioned between the upper edge of the second area 38 and the lower end of the first seal 33 (see an arrow ii in FIG. 3).

3) The pressurized air is supplied under constant pressure to the reservoir A 11 from the pressurized air supply source A 71 via the air pressure supply pipe A 17 for a preset time. As a result, a certain amount of the liquid material is supplied to the reservoir B 12.

4) The operation of the pressurized air supply source A 71 is stopped, and the supply of the pressurized air via the air pressure supply pipe A 17 is stopped. Hence the flow of the liquid material having continued to flow toward the reservoir B 12 so far is stopped.

5) Next, the pressurized air is supplied under constant pressure to the reservoir B 12 from the pressurized air supply source B 72 via the air pressure supply pipe B 18 for a preset time. As a result, a certain amount of the liquid material is returned to the reservoir A 11.

6) The operation of the pressurized air supply source B 72 is stopped, and the supply of the pressurized air via the air pressure supply pipe B 18 is stopped. Hence the flow of the liquid material having continued to flow toward the reservoir A 11 so far is stopped.

7) The above steps 3) to 6) are repeated. During a period of repeating those steps, the opening/closing valve 39 is kept in the open position.

(2-2) Discharge Operation

When the liquid material is discharged from the nozzle 5 in the discharge device 1 constituted as described above, the following operation is performed in accordance with the discharge control program. The following description is made, by way of example, about the case in which the operation is shifted to the discharge operation from a state that the stirring operation is ended, that the switching valve 21 is held at the first position, and that the liquid material is stored in the metering hole 31, the first area 37, and the reservoir A 11 (although a small amount of the liquid material may remain in the reservoir B 12).

1) First, the opening/closing valve 39 is set to a closed position. Thus, the communication between the liquid feed pipe B 14 and the metering hole 31 is cut off.

2) The switching valve driver 23 is operated to shift the switching valve 21 to the second position at which the nozzle 5 and the metering hole 31 are communicated with each other via the through-hole 212.

3) The plunger driver 43 is operated to descend the plunger 4 through a desired distance, thus discharging the liquid material from the nozzle 5. At that time, the discharge may be performed by moving the plunger 4 down to the lowermost position with one forward-moving operation, or by repeating the forward-moving operation and the stop operation plural times until the plunger 4 is moved down to the lowermost position. Since the opening/closing valve 39 is held at the closed position, the liquid material is avoided from flowing backward into the liquid feed pipe B 14 even when the plunger 4 is operated to move downward.

4) In order to fill the liquid material into the metering hole 31, the switching valve driver 23 is first operated to shift the switching valve 21 to the first position at which the liquid feed pipe A 13 (i.e., the reservoir A 11) and the metering hole 31 are communicated with each other.

5) The plunger driver 43 is operated to ascend the plunger 4, thus causing the tip end of the plunger 4 to be positioned in the first area 37 of the branch portion 35 (preferably, causing the tip end of the plunger 4 to be positioned above the second area 38). As a result, the liquid material inside the reservoir A 11 is filled into the metering hole 31.

6) Continuous discharge can be performed by repeating the above steps 2) to 5). During a period of repeating those steps, the opening/closing valve 39 is kept in the closed position.

(3) Operational Effects

The above-described discharge device 1 according to Example 2 can also provide similar operational effects to those in Example 1.

Example 3

A discharge device 1 according to Example 3 is mainly different from that according to Example 1 in including a joint member 141 that supports the reservoir B 12. The following description is made mainly about different points, and description of the same points is omitted.

(1) Constitution

Figure 4:
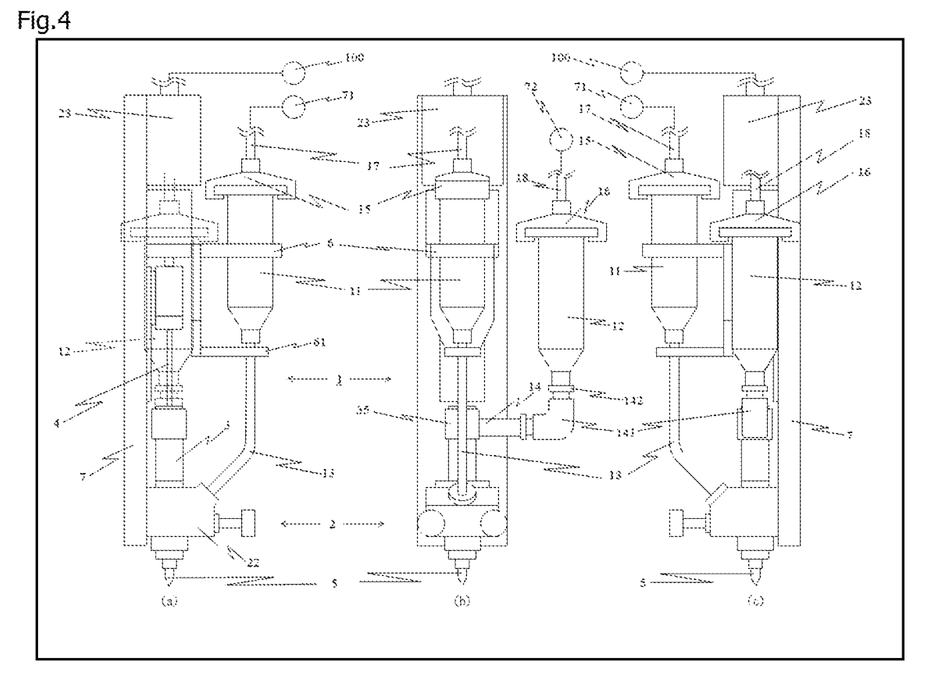
FIG. 4(a) is a left side view of a discharge device according to Example 3.
FIG. 4(b) is a front view.
FIG. 4(c) is a right side view.

FIG. 4(*a*) is a left side view of the discharge device 1 according to Example 3, FIG. 4(*b*) is a front view, and FIG. 4(*c*) is a right side view. In FIG. 4(*a*), dotted lines denote portions appearing in a seeing-through manner.

In this Example, the reservoir A 11 is arranged on the front side, and the reservoir B 12 is arranged on the right lateral side. The reservoir A 11 is supported at its barrel portion by the holder 6 that is fixed to the base member 7. The holder 6 includes a pipe support member 61 having an L-like shape when viewed from side, and the pipe support member 61 supports a liquid feed pipe A 13. The liquid feed pipe A 13 is constituted by a thin pipe as in Example 1.

A liquid feed pipe B 14 in this Example is constituted by a fat pipe having strength enough to support the reservoir B 12 in which the liquid is filled. The liquid feed pipe B 14 extends horizontally from the branch portion 35 and is coupled to the joint member 141. A connector 142 is disposed in an upper portion of the joint member 141, and the reservoir B 12 is detachably attached to the connector 142. Although the reservoir A and the reservoir B 12 are arranged in different heights, there is no influence upon the stirring effect.

A connector A 15 is detachably fitted to a flange provided at an upper end of the reservoir A 11, and the reservoir A 11 receives pressurized air supplied from a pressurized air supply source A 71 via an air pressure supply pipe A 17. A connector B 16 is detachably fitted to a flange provided at an upper end of the reservoir B 12, and the reservoir B 12 receives pressurized air supplied from a pressurized air supply source B 72 via an air pressure supply pipe B 18. Operations of the drivers (23 and 43) and the pressurized air supply sources (71 and 72) are controlled by the discharge control device 100 as in Example 1.

Other Points are Similar to those in Example 1.

Unlike this Example, the reservoir B 12 may be arranged on the left lateral side.

Unlike this Example, the pressurized air supply source A 71 and the pressurized air supply source B 72 may be implemented with a combination of one pressurized air supply source and a switching valve. In other words, the pressurized air may be supplied from one pressurized air supply source to two reservoirs (11 and 12) by using a switching valve that has a first position at which the pressurized air supply source and the air pressure supply pipe A 17 are communicated with each other, and a second position at which the pressurized air supply source and the air pressure supply pipe B 18 are communicated with each other.

(2) Operations

The stirring operation and the discharge operation are similar to those in Example 1.

(3) Operational Effects

The above-described discharge device 1 according to Example 3 can also provide similar operational effects to those in Example 1.

Example 4

A discharge device 1 according to Example 4 is mainly different from that according to Example 3 in including liquid sensors (81 and 82). The following description is made mainly about different points, and description of the same points is omitted.

(1) Constitution

Figure 5:
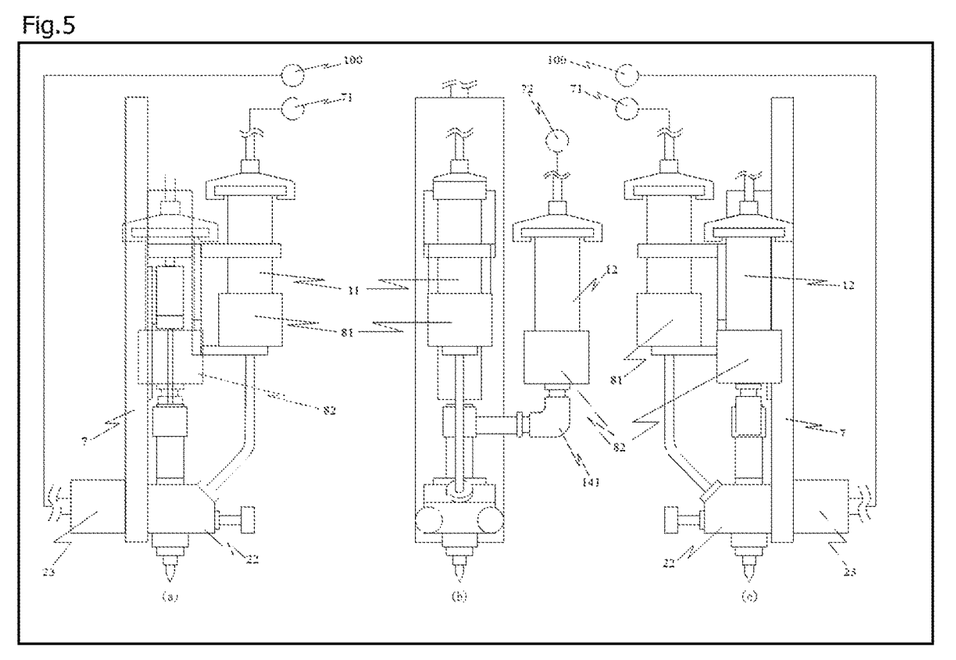
FIG. 5(a) is a left side view of a discharge device according to Example 4.
FIG. 5(b) is a front view.
FIG. 5(c) is a right side view.

FIG. 5(*a*) is a left side view of the discharge device 1 according to Example 4, FIG. 5(*b*) is a front view, and FIG. 5(*c*) is a right side view.

The liquid sensors (81 and 82) are arranged in lower portions of the reservoirs (11 and 12), respectively, and are each constituted by an optical sensor or an ultrasonic sensor, for example. The liquid sensors (81 and 82) are connected to the discharge control device 100 via control wirings (not illustrated), and they send detected signals to the discharge control device 100. More specifically, each liquid sensor detects whether the liquid material is present at a detection position, and sends a liquid presence signal to the discharge control device 100 when the liquid material is present, and a liquid absence signal to the discharge control device 100 when the liquid material is not present.

When the signal detected at the detection position has changed from the liquid presence signal to the liquid absence signal, the discharge control device 100 determines that the position of the water head (i.e., the liquid level) in the reservoir (11, 12) has lowered, and controls the operation of the pressurized air supply source (71, 72). In this connection, detection operations by the liquid sensors (81 and 82) may be linked with pressurization operations of the pressurized air supply sources (71 and 72) such that only one of the liquid sensors (81 and 82), which is related to the pressurization operation, is controlled to perform the detection operation.

The switching valve driver 23 is disposed on a rear side of the valve block 22 with the base member 7 interposed between them. Also in Example 4, the discharge device 1 can be constituted in a relatively small width by arranging the switching valve driver 23 and the plunger driver 43 in the vertical direction.

The discharge control program is designed as a program to perform operations described below.

Other Points are Similar to those in Example 3.

While this Example discloses the configuration in which one liquid sensor is disposed on one reservoir, two liquid sensors may be disposed in upper and lower portions of one reservoir, and the stirring operation may be performed under condition that the position of the water head is controlled to move up and down between the two liquid sensors. The liquid sensors are not always required to be disposed on the reservoirs (11 and 12), and they may be disposed on the liquid feed pipes (13 and 14).

(2) Operations (2-1) Stirring Operation

When the liquid material is stirred in the discharge device 1 constituted as described above, the following operation is performed in accordance with the discharge control program. It is here assumed that the liquid material is stored only in the reservoir A 11.

1) First, the switching valve driver 23 is operated to shift the switching valve 21 to the first position at which the liquid feed pipe A 13 (i.e., the reservoir A 11) and the metering hole 31 are communicated with each other.

2) The plunger driver 43 is operated to ascend the plunger 4 up to the uppermost position, thus causing the tip end of the plunger 4 to be positioned between the upper edge of the second area 38 and the lower end of the first seal 33.

3) The liquid sensor A 81 detects whether the liquid material is present at the detection position, and sends the detected signal to the discharge control device 100.

4) The pressurized air is supplied under constant pressure to the reservoir A 11 from the pressurized air supply source A 71 via the air pressure supply pipe A 17. As a result, the liquid material is caused to flow through the liquid feed pipe A 13, the communication groove 211 of the switching valve 21, the metering hole 31, the first area 37, the second area 38, and the liquid feed pipe B 14 in sequence, whereby the liquid material is supplied to the reservoir B 12.

5) When the liquid absence signal is sent from the liquid sensor A 81 to the discharge control device 100, the supply of the pressurized air from the pressurized air supply source A 71 is stopped.

6) The liquid sensor B 82 detects whether the liquid material is present at the detection position, and sends the detected signal to the discharge control device 100.

7) The pressurized air is supplied under constant pressure to the reservoir B 12 from the pressurized air supply source B 72 via the air pressure supply pipe B 18. As a result, the liquid material is caused to flow through the liquid feed pipe B 14, the second area 38, the first area 37, the metering hole 31, the communication groove 211 of the switching valve 21, and the liquid feed pipe A 13 in sequence, whereby the liquid material is returned to the reservoir A 11.

8) When the liquid absence signal is sent from the liquid sensor B 82 to the discharge control device 100, the supply of the pressurized air from the pressurized air supply source B 72 is stopped.

9) The above steps 3) to 8) are repeated. The detection operation by the liquid sensor A 81 may be stopped in the above step 5), and the detection operation by the liquid sensor A 81 may be started in the above step 8). Similarly, the detection operation by the liquid sensor B 82 may be stopped in the above step 8), and the detection operation by the liquid sensor B 82 may be started in the above step 5).

(2-2) Discharge Operation

The discharge operation is similar to that in each of Examples 1 and 2, and hence description of the discharge operation is omitted. During the discharge operation, an amount of the remaining liquid material may be detected using the liquid sensor (81, 82).

(3) Operational Effects

With the above-described discharge device 1 according to Example 4, the liquid material can be sufficiently stirred by detecting the amount of the remaining liquid material with the liquid sensor (81, 82), and by transferring the liquid material in a proper amount with no need of previously setting a pressurization time when the liquid material is transferred from one reservoir to the other reservoir in the stirring operation.

LIST OF REFERENCE SIGNS

1: discharge device, 2: switching valve unit, 3: metering portion, 4: plunger, 5: nozzle, 6: holder, 7: base member, 11: reservoir A (first reservoir), 12: reservoir B (second reservoir), 13: liquid feed pipe A, 14: liquid feed pipe B, 15: connector A, 16: connector B, 17: air pressure supply pipe A (first air pressure supply pipe), 18: air pressure supply pipe B (second air pressure supply pipe), 21: switching valve, 22: valve block, 23: switching valve driver, 31: metering hole, 33: first seal, 34: second seal, 35: branch portion, 37: first area, 38: second area (branch flow path), 39: opening/closing valve, 41: slider, 42: slide rail, 43: plunger driver, 51: nozzle coupling member, 61: pipe support member, 71: pressurized air supply source A, 72: pressurized air supply source B, 81: liquid sensor A (first liquid sensor), 82: liquid sensor B (second liquid sensor), 100: discharge control device

The invention claimed is:

1. A discharge device for a liquid material, the discharge device comprising:
    a first reservoir that stores the liquid material;
    a metering portion having a metering hole;
    a plunger moving back and forth in the metering hole;
    a nozzle having a discharge port through which the liquid material is discharged;
    a switching valve having a first position at which an outlet port of the first reservoir and the metering hole are communicated with each other, and a second position at which the metering hole and the nozzle are communicated with each other;
    a plunger driver that moves the plunger back and forth; and
    a switching valve driver that shifts the switching valve between the first position and the second position,
    the discharge device further comprising:
    a second reservoir that stores the liquid material;
    a branch portion provided in an upper portion of the metering hole and having a branch flow path; and
    an opening/closing mechanism that establishes or cuts off communication between an outlet port of the second reservoir and the metering hole,
    wherein the outlet port of the second reservoir is disposed at a lower end of the second reservoir, and
    wherein the discharge device further comprises a transfer mechanism which transfers liquid material in the first reservoir to the second reservoir via the metering bore, and transfers liquid material in the second reservoir to the first reservoir via the metering bore.

2. The discharge device for the liquid material according to claim 1, wherein the outlet port of the first reservoir is disposed at a lower end of the first reservoir.

3. The discharge device for the liquid material according to claim 1, wherein the transfer mechanism comprises a first pressurized air supply source connected to the first reservoir and a second pressurized air supply source connected to the second reservoir.

4. The discharge device for the liquid material according to claim 1, wherein a volume ratio of the first reservoir to the second reservoir is 1:0.5 to 1 or 0.5 to 1:1.

5. The discharge device for the liquid material according to claim 1, further comprising a discharge control device including a processor and a storage device in which a discharge control program is stored, the discharge control program comprising:
    a first transfer step of transferring the liquid material inside the first reservoir to the second reservoir in the state that the switching valve is held at the first position and the opening/closing mechanism is held at the open position;
    a second transfer step of transferring the liquid material inside the second reservoir to the first reservoir in the state that the switching valve is held at the first position and the opening/closing mechanism is held at the open position; and
    a continuous transfer step of alternately executing the first transfer step and the second transfer step.

6. The discharge device for the liquid material according to claim 5, wherein a tip end of the plunger is brought into a state positioned above the branch flow path in the first and second transfer steps.

7. The discharge device for the liquid material according to claim 5, wherein the discharge control program further comprises a discharge preparation step of ending execution of the continuous transfer step after completion of the second transfer step, shifting the opening/closing mechanism to a closed position, and shifting the switching valve to the second position; and
    a discharge step of descending the plunger and discharging the liquid material inside the metering hole.

8. The discharge device for the liquid material according to claim 7, wherein the liquid material inside the metering hole is discharged plural times in the discharge step by repeating an operation of descending and stopping the plunger plural times.

9. The discharge device for the liquid material according to claim 1, further comprising:
    a first liquid sensor disposed in the first reservoir or a liquid feed pipe connected to the outlet port of the first reservoir; and
    a second liquid sensor disposed in the second reservoir or a liquid feed pipe connected to the outlet port of the second reservoir.

10. The discharge device for the liquid material according to claim 1, further comprising a seal disposed at a lower side of the branch portion and having an opening that allows the plunger to be held in slide contact with the seal.

11. The discharge device for the liquid material according to claim 1, wherein the opening/closing mechanism is constituted by an opening/closing valve.

12. The discharge device for the liquid material according to claim 1, wherein the switching valve has the first position at which the outlet port of the first reservoir and the metering hole are communicated with each other through a two-way passage.

13. The discharge device for the liquid material according to claim 1, wherein the switching valve has the first position at which the outlet port of the first reservoir and a lower portion of the metering hole are communicated with each other,
the branch flow path of the branch portion is coupled to the second reservoir, and
the opening/closing mechanism establishes or cuts off communication between the outlet port of the second reservoir and the metering hole through the branch portion.

14. The discharge device for the liquid material according to claim 1, wherein the metering hole is positioned midway a flow path communicating the first reservoir and the second reservoir with each other when the transfer mechanism transfers the liquid material in the first reservoir to the second reservoir via the metering bore, or transfers the liquid material in the second reservoir to the first reservoir via the metering bore.

15. An application apparatus comprising:
the discharge device for the liquid material according to claim 1; and
a relatively moving device that moves the discharge device for the liquid material and the application target object relative to each other.

16. A discharge method for a liquid material, the discharge method executing the following steps using the discharge device for the liquid material according to claim 1:
a first transfer step of transferring the liquid material inside the first reservoir to the second reservoir in the state that the switching valve is held at the first position and the opening/closing mechanism is held at the open position;
a second transfer step of transferring the liquid material inside the second reservoir to the first reservoir in the state that the switching valve is held at the first position and the opening/closing mechanism is held at the open position;
a discharge preparation step of shifting the switching valve to the second position; and
a discharge step of descending the plunger and discharging the liquid material inside the metering hole.

17. The discharge method for the liquid material according to claim 16, wherein the liquid material is transferred so that the liquid level does not reach the switching valve in the first transfer step, and
the liquid material is transferred so that the liquid level does not reach the opening/closing mechanism in the second transfer step.

18. The discharge method for the liquid material according to claim 16, wherein 60% or more of the liquid material inside the first reservoir is transferred in the first transfer step, and
60% or more of the liquid material inside the second reservoir is transferred in the second transfer step.

* * * * *